United States Patent
Sauerhoefer et al.

(10) Patent No.: US 10,260,426 B2
(45) Date of Patent: Apr. 16, 2019

(54) SENSOR ADAPTER

(71) Applicant: United Technologies Corporation, Hartford, CT (US)

(72) Inventors: Marc R. Sauerhoefer, Coventry, CT (US); Ryan K. Snyder, Glastonbury, CT (US); James D. Marshall, Derby, CT (US); Kari L. Kisselbrack, Portland, CT (US); Thomas Livingston, Holyoke, MA (US)

(73) Assignee: UNITED TECHNOLOGIES CORPORAATION, Farmington, CT (US)

( * ) Notice: Subject to any disclaimer, the term of this patent is extended or adjusted under 35 U.S.C. 154(b) by 689 days.

(21) Appl. No.: 14/427,396

(22) PCT Filed: Feb. 10, 2013

(86) PCT No.: PCT/US2013/025469
§ 371 (c)(1),
(2) Date: Mar. 11, 2015

(87) PCT Pub. No.: WO2014/055101
PCT Pub. Date: Apr. 10, 2014

(65) Prior Publication Data
US 2015/0247460 A1 Sep. 3, 2015

Related U.S. Application Data

(60) Provisional application No. 61/708,100, filed on Oct. 1, 2012.

(51) Int. Cl.
*F02C 7/32* (2006.01)
*F01D 17/02* (2006.01)
(Continued)

(52) U.S. Cl.
CPC ............. *F02C 7/32* (2013.01); *F01D 17/02* (2013.01); *F01D 25/18* (2013.01); *F01D 25/20* (2013.01)

(58) Field of Classification Search
CPC . F02C 7/32; F01D 17/02; F01D 25/18; F01D 25/20
(Continued)

(56) References Cited

U.S. PATENT DOCUMENTS 3,779,007 A 12/1973 Lavash
3,976,165 A * 8/1976 Pilarczyk ............. F01D 25/186
184/6.1
(Continued)

FOREIGN PATENT DOCUMENTS

EP 1790831 8/2012
GB 2294091 A 4/1996
(Continued)

OTHER PUBLICATIONS

International Search Report and Written Opinion for PCT Application No. PCT/US2013/025469, dated Jun. 26, 2013.
(Continued)

*Primary Examiner* — Phutthiwat Wongwian
*Assistant Examiner* — Loren Edwards
(74) *Attorney, Agent, or Firm* — Carlson, Gaskey & Olds, P.C.

(57) ABSTRACT

An adapter for a gas turbine engine has a first portion with a control module mount interface. A second portion with a sensor mount interface defines a sensor mount position relative to a control module. A connecting body connects the first and second portions such that the second portion provides a re-orientated sensor mount position relative to the control module. A lubrication system for a gas turbine engine is also disclosed.

26 Claims, 4 Drawing Sheets

(51) Int. Cl.
    *F01D 25/18*    (2006.01)
    *F01D 25/20*    (2006.01)
(58) Field of Classification Search
    USPC ........................................................ 60/39.08
    See application file for complete search history.

(56) References Cited

U.S. PATENT DOCUMENTS

| | | | |
|---|---|---|---|
| 4,020,632 | A | 5/1977 | Coffinberry et al. |
| 4,041,697 | A | 8/1977 | Coffinberry et al. |
| 4,343,593 | A | 8/1982 | Harris |
| 4,576,001 | A | 3/1986 | Smith |
| 4,891,934 | A | 1/1990 | Huelster |
| 5,291,863 | A | 3/1994 | Jones |
| 5,911,678 | A | 6/1999 | White |
| 5,957,240 | A | 9/1999 | Apostolides |
| 6,058,694 | A | 5/2000 | Ackerman et al. |
| 7,571,597 | B2 | 8/2009 | Delaloye |
| 2007/0213917 | A1 | 9/2007 | Bruno et al. |
| 2009/0099750 | A1 | 4/2009 | Delaloye et al. |
| 2010/0065013 | A1 | 3/2010 | Weber et al. |

FOREIGN PATENT DOCUMENTS

| | | |
|---|---|---|
| JP | 05288024 | 11/1993 |
| KR | 1020120018022 | 2/2012 |

OTHER PUBLICATIONS

International Preliminary Report on Patentability for International Application No. PCT/US2013/025469 dated Apr. 16, 2015.
Supplementary European Search Report for European Application No. 13843220.8 dated May 24, 2016.

\* cited by examiner

SENSOR ADAPTER

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Modern gas turbine engines for commercial flight are designed and built with numerous system level feedback and controls. The operability of feedback and control is largely due in part to detection and sensing components used to obtain and transmit signals for engine process control from a variety of inputs such as air, fuel and lubrication systems. These systems reside on the exterior of major engine cases and are designed to be packaged between the case and the outer confines of the enclosure or nacelle and amongst other functional systems and components. These systems components and their housings typically have a relatively large girth by themselves and occupy a large design workspace which often leads to limited points of entry and connection direction for the mating sensors and associated signal wiring leads. The use of shared component geometry results in highly restrictive design configuration for any subsequent engine designs which would typically have different architectural design spaces. This can equate to less volumetric design space, limited orientation and placement for sensors and their wiring.

SUMMARY

In one featured embodiment, an adapter for a gas turbine engine has a first portion with a control module mount interface, a second portion with a sensor mount interface defining a sensor mount position relative to a control module. A connecting body connects the first and second portions such that the second portion provides a re-orientated sensor mount position relative to the control module.

In another embodiment according to the previous embodiment, the first portion comprises a first mount flange with a first plurality of circumferentially spaced holes.

In another embodiment according to any of the previous embodiments, the second portion comprises a second mount flange with a second plurality of circumferentially spaced holes.

In another embodiment according to any of the previous embodiments, the connecting body has a reduced body portion between the first and second mount flanges that defines intersections between the first and second pluralities of circumferentially spaced holes.

In another embodiment according to any of the previous embodiments, the first plurality of circumferentially spaced holes has elongated holes with an arcuate shape.

In another embodiment according to any of the previous embodiments, the first plurality of circumferentially spaced holes has generally straight holes with a cylindrical shape.

In another embodiment according to any of the previous embodiments, the first and second pluralities of circumferentially spaced holes each have elongated holes with an arcuate shape.

In another embodiment according to any of the previous embodiments, the first portion includes a stem extending outwardly to be received within an adapter bore in the control module.

In another embodiment according to any of the previous embodiments, the second portion includes a bore to receive a sensor.

In another featured embodiment, a lubrication system for a gas turbine engine has a sensor measuring a flow lubricant through the system. An adaptor support the sensor and defines passageways for communicating lubricant flow to the sensor.

In another embodiment according to the previous embodiment, an oil control module with at least one oil filter measures a differential pressure across the oil filter.

In another embodiment according to any of the previous embodiments, the adaptor has a first portion with a control module mount interface, a second portion with a sensor mount interface defining a sensor mount position relative to the oil control module. A connecting body connects the first and second portions such that second portion provides a re-orientated sensor mount position relative to the control module.

In another embodiment according to any of the previous embodiments, the first portion has a first mount flange with a first plurality of circumferentially spaced holes. The second portion has a second mount flange with a second plurality of circumferentially spaced holes.

In another embodiment according to any of the previous embodiments, the connecting body has a reduced body portion between the first and second mount flanges that defines intersections between the first and second pluralities of circumferentially spaced holes.

In another embodiment according to any of the previous embodiments, the first plurality of circumferentially spaced holes has elongated holes with an arcuate shape.

In another embodiment according to any of the previous embodiments, the first plurality of circumferentially spaced holes has generally straight holes with a cylindrical shape.

In another embodiment according to any of the previous embodiments, the first and second pluralities of circumferentially spaced holes each have elongated holes with an arcuate shape.

In another embodiment according to any of the previous embodiments, the first portion includes a stem extending outwardly to be received within an adapter bore in the control module.

In another embodiment according to any of the previous embodiments, the second portion includes a bore to receive a sensor.

In another embodiment according to any of the previous embodiments, the first portion includes a first plurality of elongated arcuate holes circumferentially spaced apart from each other about the stem. The second portion includes a second plurality of elongated arcuate holes circumferentially spaced apart from each other about a bottom of the bore.

BRIEF DESCRIPTION OF THE DRAWINGS

The disclosure can be further understood by reference to the following detailed description when considered in connection with the accompanying drawings wherein.

DETAILED DESCRIPTION

Figure 1:
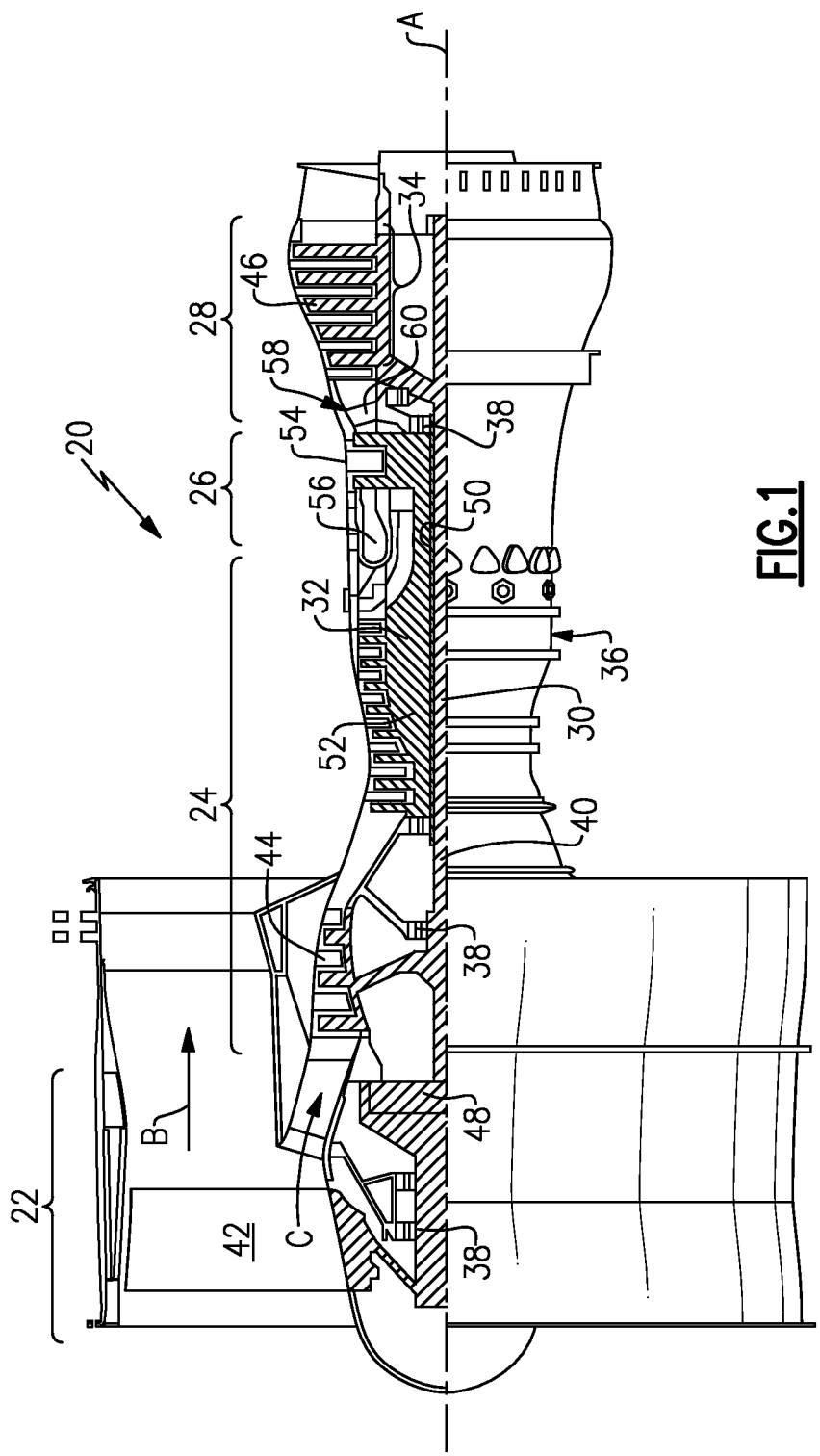
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Referring to FIGS. 2-9, with continued reference to FIG. 1, disclosed are designs which optimize the spatial arrangement of an interfacing sensor to provide an enhanced packaging for maintainability of the associated system. Spatial orientation of sensors and adjacent parts can be altered for improved configurations through the use of such adapters which can be designed for relocating the sensor without the loss of sensitivity or recalibration of the system.

Figure 2A:
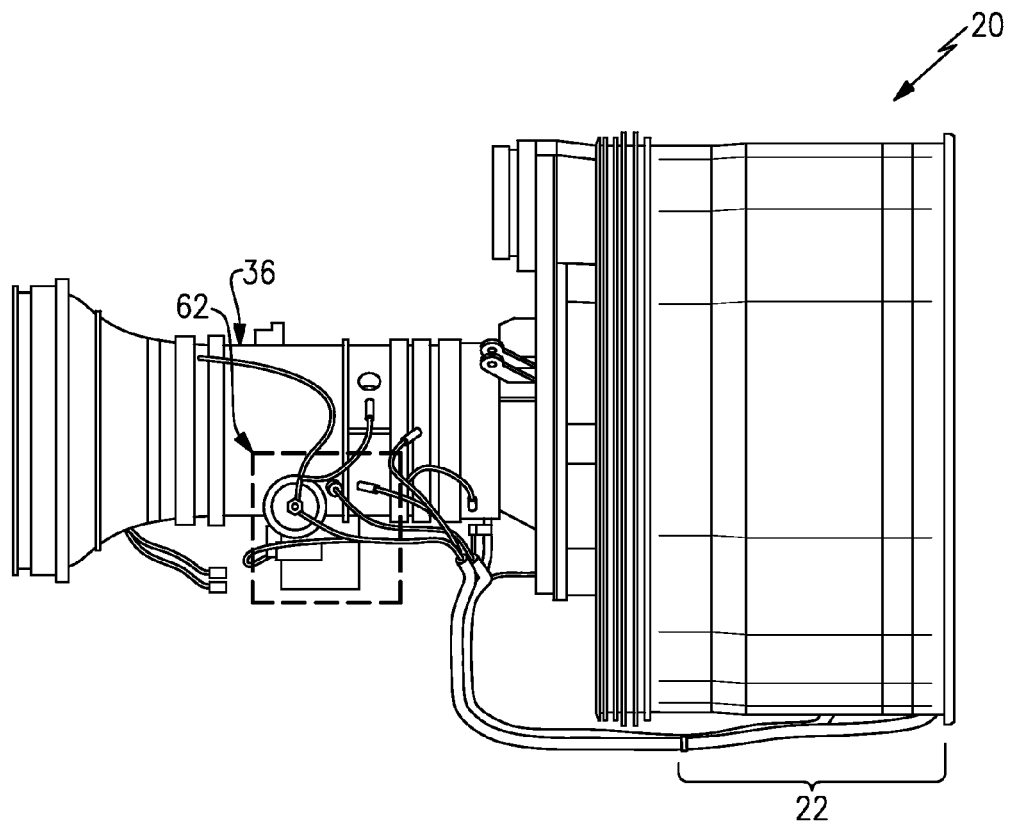
FIG. 2A is a side view of a gas turbine engine with an oil control module.

The disclosed examples are for geared turbofan engines that include an advanced gearbox requiring a supply of clean cool oil. This disclosed example is an adapter for a sensor designed for an Oil Control Module 62 (OCM) (FIG. 2A). The adapter couples an Oil Filter Differential Pressure Sensor 64 (OFDP) (FIG. 3) to the OCM 62.

Figure 2B:
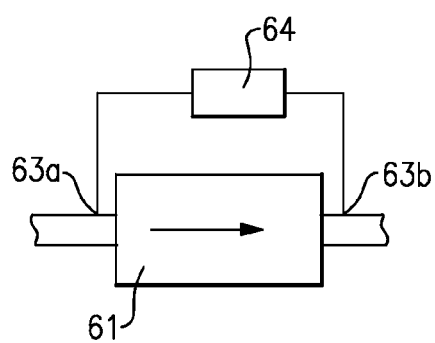
FIG. 2B is a schematic view of a main oil filter from the oil control module.
Figure 3:
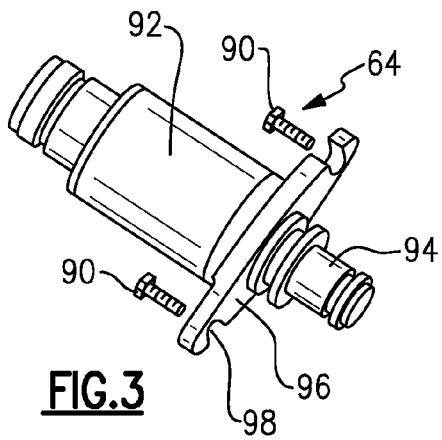
FIG. 3 is a perspective view of an oil filter differential pressure sensor.
Figure 4:
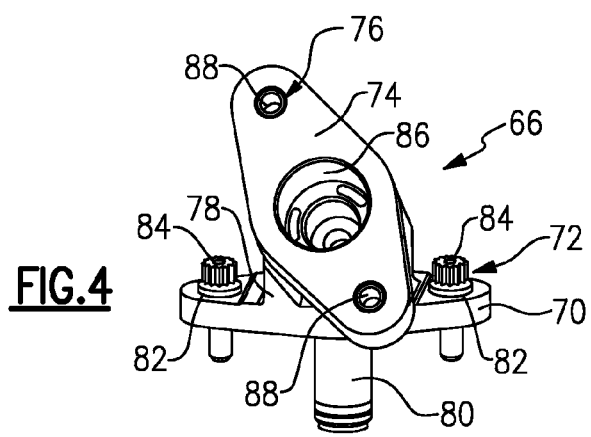
FIG. 4 is a front view of an adapter for an oil filter differential pressure sensor.
Figure 5:
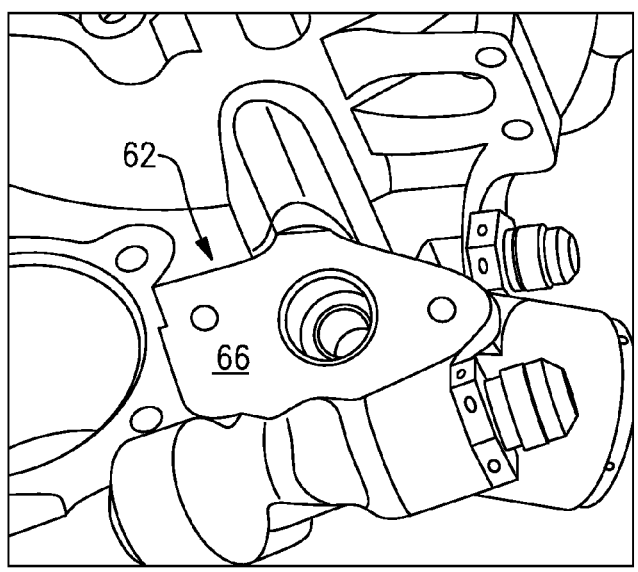
FIG. 5 is a magnified view of the oil control module showing a mount interface for the sensor or adapter.

The oil filter differential pressure sensor 64 measures the differential pressure across a main oil filter 61 (FIG. 2B). The pressure measurements are achieved through separated porting both upstream 63a and downstream 63b of the oil filter 61. This differential pressure is used for lubrication system health monitoring purposes.

An adaptor 66 (FIG. 4) for the (OFDP) sensor 64 reorients and relocates the sensor 64 for effective packaging within this engine architecture. The relocation provides improved maintainability and a solution for achieving the required clearances to the surrounding hardware and the engine nacelle. The adapter 66 is ported to maintain the key characteristics of impingement volume and avoids amplification of the pump pulsations which could arise from an excess volume. The example adaptor 66 provides a weight optimized geometry on both the exterior and interior cross sections which have minimum feature sizes optimized for manufacturability and inspection of the unique port geometry.

The adaptor 66 includes a first portion 70 with a control module mount interface 72, a second portion 74 with a sensor mount interface 76 defining a different mount position for the sensor 64 relative to the control module 62, and a connecting body 78 that connects the first 70 and second 74 portions. The sensor 64 (FIG. 3) is mounted to the adaptor 66 at the sensor mount interface 76.

In one example, the first portion 70 comprises a first mount flange having an extension portion 80 or stem that fits within an opening in the control module 62. In the example shown, the mount interface 72 comprises fastener openings 82 formed in the first portion 70 that are configured to receive fasteners 84 to secure the adaptor 66 to the control module 62. In this example, the second portion 74 comprises a second mount flange that with a bore 86 configured to receive a portion of the sensor 64. The mount interface 76 comprises fastener openings 88 formed in the second portion 74 that are configured to receive fasteners 90 to secure the sensor 64 to the adaptor 66. While fasteners are shown, it should be understood that other attachment methods could also be used.

The connecting body 78 comprises a narrowing neck portion that connects the first 70 and second 74 portions together. The connector body 78 is configured such that the second mount position for the sensor 64 is different than the first mount position at the control module 62.

The sensor 64 comprises a sensor body 92 having an extension portion 94 or stem that extends into the control module 62 to measure the oil differential pressure in the filter 61 as known. A mount flange 96 extends outwardly around the sensor body 90 and includes a mount interface 98 for attachment to the control module 62. The adaptor 66 is used to change the orientation of the sensor 64 relative to the control module 62. The extension portion 80 of the adaptor 66 is inserted into the sensor opening in the control module 62 and the first portion 70 is attached to the control module with fasteners 84.

Once the adaptor 66 is attached to the control module 62, the sensor 64 is then attached to the second portion 74 of the adaptor at the mount interface 96 of the sensor 64. This results in effectively re-orienting the sensor body to a different place (see FIG. 9) than that established by the control module 62 alone.

Figure 6:
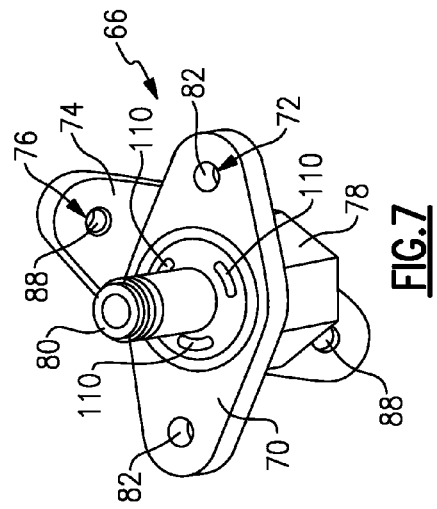
FIG. 6 is a top view of the adapter of FIG. 4.
Figure 7:
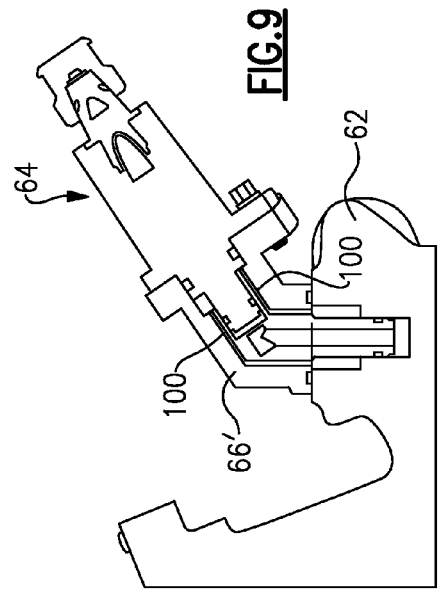
FIG. 7 is a perspective view of the adapter of FIG. 4.
Figure 8:
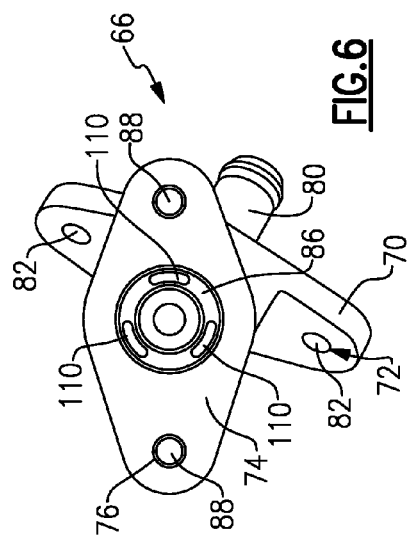
FIG. 8 is a phantom view of FIG. 7 showing port intersections.
Figure 9:
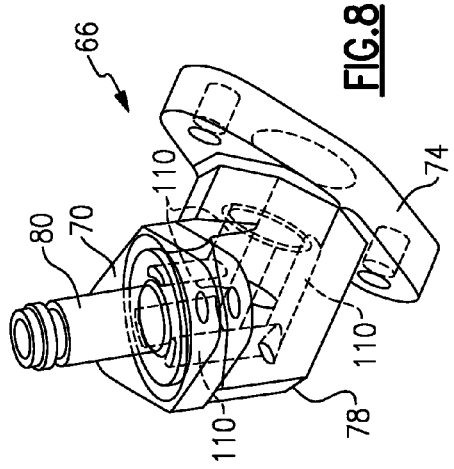
FIG. 9 is a section view of another example of an adapter.

The adaptor 66 includes a concentrically placed "bean-shaped" passageway feature that ports the oil pressure from the OCM 62 to the OFDP sensor 64 (FIGS. 6-8). This non-standard geometry maximizes each port area while reducing the number of passageways as compared with straight through holes 100 shown in another adapter 66' illustrated in FIG. 9.

The "bean-shaped" passageway feature includes a plurality of bean-shaped openings 110 that are formed within the first 70 and second 74 portions. The bean-shaped openings are elongated holes having an arcuate shape. One set of bean openings 110 is formed circumferentially about the extension portion 80 of the first portion 70 of the adaptor 66 (FIG. 7) and another set of bean shaped openings 110 are formed circumferentially about a bottom portion of the bore 86 in the second portion 74 of the adaptor 66 (FIG. 6). The two sets of bean-shaped openings 110 intersect with each other within the connecting body 78 as shown in FIG. 8.

The concentric bean-shaped port geometry results in less intersecting edges for finishing and inspection and provides greater wall thickness control having a larger cross section and improved directional control to mate with the counterpart bore produced from the opposite mating face. Conventional straight drilling operations for this high aspect (l/d) length/diameter hole would result in potential drill or electrode clogging or walk of the tool during the plunging operation. The peanut shaped holes provide the volume and cross section to obtain the oil pressure response necessary for sensing.

Accordingly, the disclosed example adaptor 66 for the OFDP sensor 64 orientates sensor connections and porting thereby improving maintainability, machinability and engine reliability.

Although an example embodiment has been disclosed, a worker of ordinary skill in this art would recognize that certain modifications would come within the scope of the claims. For that reason, the following claims should be studied to determine their true scope and content.

What is claimed is:
1. An adapter for a gas turbine engine comprising:
   a first portion with a control module mount interface configured to be attached to a control module, the first portion comprising a first mount flange to be directly attached to the control module;

a second portion with a sensor mount interface configured to be attached to a sensor, the second portion defining a sensor mount position relative to the control module, and wherein the second portion comprises a second mount flange to be directly attached to the sensor;

the first mount flange comprising a first surface with a stem extending outwardly from the first surface to be inserted directly into an adapter bore in the control module and at least one first fastener opening in the first surface to receive at least one first fastener to attach the first mount flange to the control module;

the second mount flange comprising a second surface with a bore extending inwardly from the second surface to directly receive the sensor and at least one second fastener opening in the second surface to receive at least one second fastener to attach the second mount flange to the sensor; and a connecting body that connects the first and second portions such that the second portion provides a re-orientated sensor mount position relative to the control module, the connecting body including passageways that communicate lubricant flow to the sensor.

2. An adapter for a gas turbine engine comprising:
a first portion with a control module mount interface configured to be attached to a control module;
a second portion with a sensor mount interface configured to be attached to a sensor, the second portion defining a sensor mount position relative to the control module; and
a connecting body that connects the first and second portions such that the second portion provides a re-orientated sensor mount position relative to the control module, the connecting body including passageways that communicate lubricant flow to the sensor, and wherein the first portion comprises a first mount flange having a module connector defining a first axis, and the first mount flange having a flange surface that surrounds the module connector and includes a first plurality of holes circumferentially spaced apart from each other about the first axis and in fluid communication with the passageways.

3. The adapter according to claim 2 wherein the second portion comprises a second mount flange having a sensor connector defining a second axis, and the second mount flange having a flange surface that surrounds the sensor connector and includes a second plurality of holes circumferentially spaced apart from each other about the second axis and in fluid communication with the passageways.

4. The adapter according to claim 3 wherein the connecting body comprises a reduced body portion comprising a narrowing neck portion that extends from the first mount flange to the second mount flange and that defines the passageways that provide intersections between the first and second pluralities of holes.

5. The adapter according to claim 3 wherein the first and second pluralities of holes each comprise elongated holes having an arcuate shape.

6. The adaptor according to claim 5 wherein the first and second pluralities of holes have a bean-shape such that the arcuate shape of the elongated holes extends circumferentially to surround a portion of a respective one of the first and second axes.

7. The adapter according to claim 3 wherein the module connector comprises a stem extending outwardly from the first mount flange to be directly received within an adapter bore in the control module.

8. The adapter according to claim 7 wherein the sensor connector comprises a bore to directly receive a sensor.

9. The adaptor according to claim 3 wherein the first mount flange includes at least one or more first fastener openings that extend parallel to the first axis and receive one or more first fasteners to secure the adaptor to the control module, and wherein the second mount flange includes at least one or more second fastener openings that extend parallel to the second axis and receive one or more second fasteners to secure the adaptor to the sensor, the first fasteners being different than the second fasteners.

10. The adaptor according to claim 3 wherein the second axis is at an obtuse angle relative to the first axis.

11. The adapter according to claim 2 wherein the first plurality of holes comprises elongated holes having an arcuate shape.

12. The adapter according to claim 2 wherein the first plurality of holes comprises generally straight holes having a cylindrical shape.

13. A lubrication system for a gas turbine engine comprising:
a control module;
a sensor measuring a lubricant flow through the lubrication system;
an adaptor supporting the sensor and defining passageways for communicating the lubricant flow to the sensor, wherein the adaptor includes a first portion attached to the control module, a second portion attached to the sensor, and a connecting body extending from the first portion to the second portion, the connecting body defining the passageways that communicate the lubricant flow to the sensor;
the first portion comprising a first mount flange to be directly attached to the control module, and wherein the second portion comprises a second mount flange to be directly attached to the sensor; and
wherein the first mount flange comprises a first surface with a stem extending outwardly from the first surface to be inserted directly into an adapter bore in the control module and at least one first fastener opening in the first surface to receive at least one first fastener to attach the first mount flange to the control module, and wherein the second mount flange comprises a second surface with a bore extending inwardly from the second surface to directly receive the sensor and at least one second fastener opening in the second surface to receive at least one second fastener to attach the second mount flange to the sensor.

14. The lubrication system according to claim 13 wherein the control module comprises an oil control module with at least one oil filter, and wherein the sensor measures a differential pressure across the oil filter.

15. The lubrication system according to claim 14 wherein the first portion has a control module mount interface and the second portion has a sensor mount interface defining a sensor mount position relative to the oil control module, and wherein the connecting body connects the first and second portions such that second portion provides a re-orientated sensor mount position relative to the control module.

16. A lubrication system for a gas turbine engine comprising:
a control module comprising an oil control module with at least one oil filter;

a sensor measuring a lubricant flow through the lubrication system, and wherein the sensor measures a differential pressure across the oil filter;

an adaptor supporting the sensor and defining passageways for communicating the lubricant flow to the sensor, wherein the adaptor includes a first portion attached to the control module, a second portion attached to the sensor, and a connecting body extending from the first portion to the second portion, the connecting body defining the passageways that communicate the lubricant flow to the sensor;

wherein the first portion has a control module mount interface and the second portion has a sensor mount interface defining a sensor mount position relative to the oil control module, and wherein the connecting body connects the first and second portions such that the second portion provides a re-orientated sensor mount position relative to the control module; and wherein the first portion comprises a first mount flange having a module connector defining a first axis, the first mount flange having a flange surface that surrounds the module connector and includes a first plurality of holes spaced circumferentially apart from each other about the first axis, and the second portion comprises a second mount flange having a sensor connector defining a second axis, the second mount flange having a flange surface that surrounds the sensor connector and includes a second plurality of holes spaced circumferentially apart from each other about the second axis.

17. The lubrication system according to claim 16 wherein the connecting body comprises a reduced body portion comprising a narrowing neck portion that extends from the first mount flange to the second mount flange and that defines the passageways that provide intersections between the first and second pluralities of holes.

18. The lubrication system according to claim 16 wherein the first plurality of holes comprises elongated holes having an arcuate shape.

19. The lubrication system according to claim 16 wherein the first plurality of holes comprises generally straight holes having a cylindrical shape.

20. The lubrication system according to claim 16 wherein the first and second pluralities of holes each comprise elongated holes having an arcuate shape.

21. The lubrication system according to claim 20 wherein the first and second pluralities of holes have a bean-shape such that the arcuate shape of the elongated holes extends circumferentially to surround a portion of a respective one of the first and second axes.

22. The lubrication system according to claim 16 wherein the module connector comprises a stem extending outwardly from the first mount flange to be directly received within an adapter bore in the control module.

23. The lubrication system according to claim 22 wherein the sensor connector comprises a bore to directly receive the sensor.

24. The lubrication system according to claim 23 wherein the first plurality of holes comprise elongated bean-shaped holes circumferentially spaced apart from each other about the first axis defined by the stem, and wherein the second plurality of holes comprise elongated bean-shaped holes circumferentially spaced apart from each other about the second axis defined by the bore, and wherein the elongated bean-shaped holes have an arcuate shape that extends circumferentially to surround a portion of a respective one of the first and second axes.

25. The lubrication system according to claim 16 wherein the first mount flange includes at least one or more first fastener openings that extend parallel to the first axis and receive one or more first fasteners to secure the adaptor to the control module, and wherein the second mount flange includes at least one or more second fastener openings that extend parallel to the second axis and receive one or more second fasteners to secure the adaptor to the sensor, the first fasteners being different than the second fasteners.

26. The lubrication system according to claim 16 wherein the second axis is at an obtuse angle relative to the first axis.

* * * * *